United States Patent [19]
Schwartz

[11] Patent Number: 5,850,883
[45] Date of Patent: Dec. 22, 1998

[54] WINDROW AUGER COMPOSTER

[76] Inventor: Darrel L Schwartz, HCR 2 Box 275, Dighton, Kans. 67839

[21] Appl. No.: 855,007

[22] Filed: May 13, 1997

[51] Int. Cl.⁶ ................................................. A01B 33/00
[52] U.S. Cl. .......................... 172/122; 172/817; 172/253; 172/247; 37/242; 37/253
[58] Field of Search .................................. 172/122, 817, 172/245, 247, 253; 37/241, 242, 244, 249, 253, 254, 403; 56/350, 14.4, 209, 372

[56] References Cited

U.S. PATENT DOCUMENTS

| | | | |
|---|---|---|---|
| 106,441 | 8/1870 | Wilson | 172/122 X |
| 1,633,164 | 3/1927 | Kissner et al. | 172/247 X |
| 2,935,802 | 5/1960 | Wolfe et al. | 172/247 X |
| 3,071,793 | 1/1963 | Lull | 172/247 X |
| 3,236,312 | 2/1966 | Vivas | 172/122 |
| 3,287,834 | 11/1966 | Hopkins | 172/247 |
| 3,320,688 | 5/1967 | Haban | 37/242 |
| 3,695,716 | 10/1972 | Meyer | 172/122 X |
| 3,758,967 | 9/1973 | Thompson | 37/242 |
| 3,767,262 | 10/1973 | Pentith | 172/122 X |
| 3,982,772 | 9/1976 | Scherer | 280/462 |
| 4,185,698 | 1/1980 | Frisbee | 172/71 |
| 4,487,004 | 12/1984 | Kejr | 56/14.4 |
| 4,815,261 | 3/1989 | Anderson | 56/126 |
| 4,819,880 | 4/1989 | Linde et al. | 239/662 |
| 4,825,570 | 5/1989 | Schmid et al. | 172/817 X |
| 4,976,095 | 12/1990 | Schnittjer | 56/350 |
| 5,348,103 | 9/1994 | Chiddicks et al. | 172/122 X |
| 5,442,990 | 8/1995 | Krohn | 172/122 X |

FOREIGN PATENT DOCUMENTS

| | | | |
|---|---|---|---|
| 533345 | 11/1976 | U.S.S.R. | 172/122 |

Primary Examiner—Michael J. Carone
Assistant Examiner—Victor Batson

[57] ABSTRACT

A new windrow auger composter that is adapted for attachment to the blade of a tractor for breaking up, aerating, and rebuilding a windrow. The inventive device includes a housing adapted for attachment to the blade of the tractor such that the housing extends upwardly from the top edge of the blade when attached thereto. An auger assembly is supported for rotation by the housing, and includes a plurality of blade members spaced along the length of the housing and disposed at an angle relative to a longitudinal axis of the auger assembly. A drive assembly is provided to rotate the auger assembly in a direction such that material contacted by the auger assembly is thrown up in the air and to one side of the composter so that the material forms a windrow at that side. When used on human and animal waste, drying time is reduced, and oxygen incorporation is increased to facilitate bacteriological action on the waste material.

20 Claims, 3 Drawing Sheets

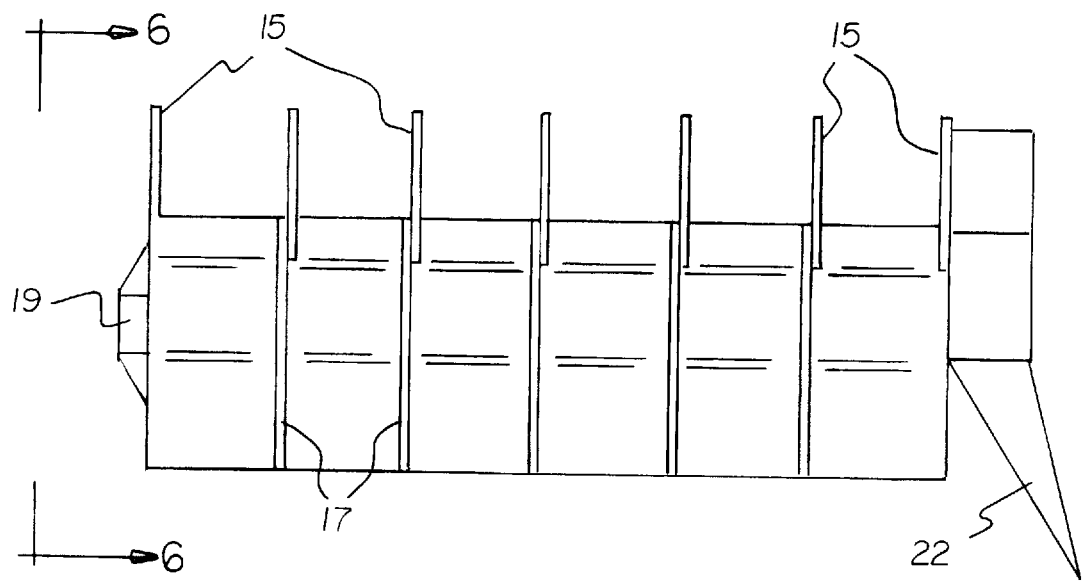
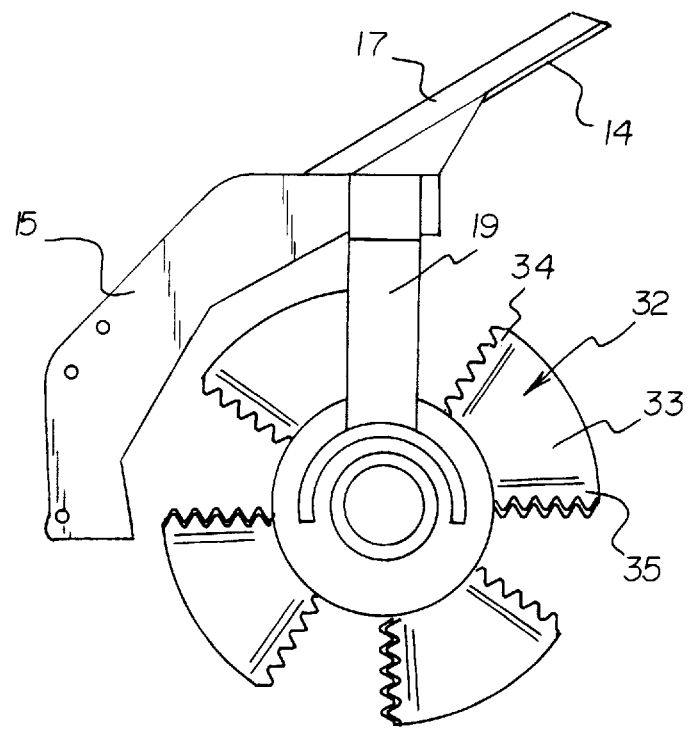

WINDROW AUGER COMPOSTER

BACKGROUND OF THE INVENTION

1. Field of the Invention

The present invention relates to apparatus for use with tractors and more particularly pertains to a new windrow auger composter which is adapted for attachment to the blade of a tractor for breaking up, aerating, and rebuilding windrows, and for use in other earth moving applications.

2. Description of the Prior Art

The use of apparatus mounted on tractors is known in the prior art. More specifically, apparatus for use with tractors heretofore devised and utilized are known to consist basically of familiar, expected and obvious structural configurations, notwithstanding the myriad of designs encompassed by the crowded prior art which have been developed for the fulfillment of countless objectives and requirements.

Known prior art apparatus for use with tractors include U.S. Pat. No. 4,185,698; U.S. Pat. No. 3,982,772; U.S. Pat. No. 4,976,095; U.S. Pat. No. 4,819,880; U.S. Pat. No. 4,815,261; and U.S. Pat. No. 4,487,004.

While these devices fulfill their respective, particular objectives and requirements, the aforementioned patents do not disclose a new windrow auger composter. The inventive device includes a housing adapted for attachment to the blade of a tractor such that the housing extends upwardly from the top edge of the blade when attached thereto. An auger assembly is supported for rotation by the housing, and includes a plurality of blade members spaced along the length of the housing and disposed at an angle relative to a longitudinal axis of the auger assembly. A drive assembly is provided to rotate the auger assembly in a direction such that material contacted by the auger assembly is thrown up in the air and to one side of the composter so that the material forms a windrow at that side. When used on human and animal waste, drying time is reduced, and oxygen incorporation is increased to facilitate bacteriological action on the waste material.

In these respects, the windrow auger composter according to the present invention substantially departs from the conventional concepts and designs of the prior art, and in so doing provides an apparatus primarily developed for the purpose of breaking up, aerating, and rebuilding a windrow.

SUMMARY OF THE INVENTION

In view of the foregoing disadvantages inherent in the known types of apparatus for use with tractors now present in the prior art, the present invention provides a new windrow auger composter construction wherein the same can be utilized for breaking up, aerating, and rebuilding a windrow.

The general purpose of the present invention, which will be described subsequently in greater detail, is to provide a new windrow auger composter apparatus which has many of the advantages of the apparatus for use with tractors mentioned heretofore and many novel features that result in a new windrow auger composter which is not anticipated, rendered obvious, suggested, or even implied by any of the prior art apparatus for use with tractors, either alone or in any combination thereof.

To attain this, the present invention generally comprises a housing adapted for attachment to the blade of a tractor such that the housing extends upwardly from the top edge of the blade when attached thereto. An auger assembly is supported for rotation by the housing, and includes a plurality of blade members spaced along the length of the housing and disposed at an angle relative to a longitudinal axis of the auger assembly. A drive assembly is provided to rotate the auger assembly in a direction such that material contacted by the auger assembly is thrown up in the air and to one side of the composter so that the material forms a windrow at that side. When used on human and animal waste, drying time is reduced, and oxygen incorporation is increased to facilitate bacteriological action on the waste material.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new windrow auger composter apparatus which has many of the advantages of the apparatus for use with tractors mentioned heretofore and many novel features that result in a new windrow auger composter which is not anticipated, rendered obvious, suggested, or even implied by any of the prior art apparatus for use with tractors, either alone or in any combination thereof.

It is another object of the present invention to provide a new windrow auger composter which may be easily and efficiently manufactured and marketed.

It is a further object of the present invention to provide a new windrow auger composter which is of a durable and reliable construction.

An even further object of the present invention is to provide a new windrow auger composter which is susceptible of a low cost of manufacture with regard to both materials and labor, and which accordingly is then susceptible of low prices of sale to the consuming public, thereby making such windrow auger composter economically available to the buying public.

Still yet another object of the present invention is to provide a new windrow auger composter which provides in the apparatuses and methods of the prior art some of the advantages thereof, while simultaneously overcoming some of the disadvantages normally associated therewith.

Still another object of the present invention is to provide a new windrow auger composter which is adapted for attachment to the blade of a tractor for breaking up, aerating, and rebuilding a windrow.

Yet another object of the present invention is to provide a new windrow auger composter which includes a housing adapted for attachment to the blade of a tractor such that the housing extends upwardly from the top edge of the blade when attached thereto. An auger assembly is supported for rotation by the housing, and includes a plurality of blade members spaced along the length of the housing and disposed at an angle relative to a longitudinal axis of the auger assembly. A drive assembly is provided to rotate the auger assembly in a direction such that material contacted by the auger assembly is thrown up in the air and to one side of the composter so that the material forms a windrow at that side. When used on human and animal waste, drying time is reduced, and oxygen incorporation is increased to facilitate bacteriological action on the waste material.

Still yet another object of the present invention is to provide a new windrow auger composter that mounts to any tractor having a blade, thus reducing equipment costs.

Even still another object of the present invention is to provide a new windrow auger composter that can be used to rebuild farm terraces, windrow dirt up along highways, and other earth moving applications.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 5 is a top view looking in the direction of line 5—5 of FIG. 2.

FIG. 6 is an end view of the present invention, looking in the direction of line 6—6 of FIG. 5.

DESCRIPTION OF THE PREFERRED EMBODIMENT

Figure 1:
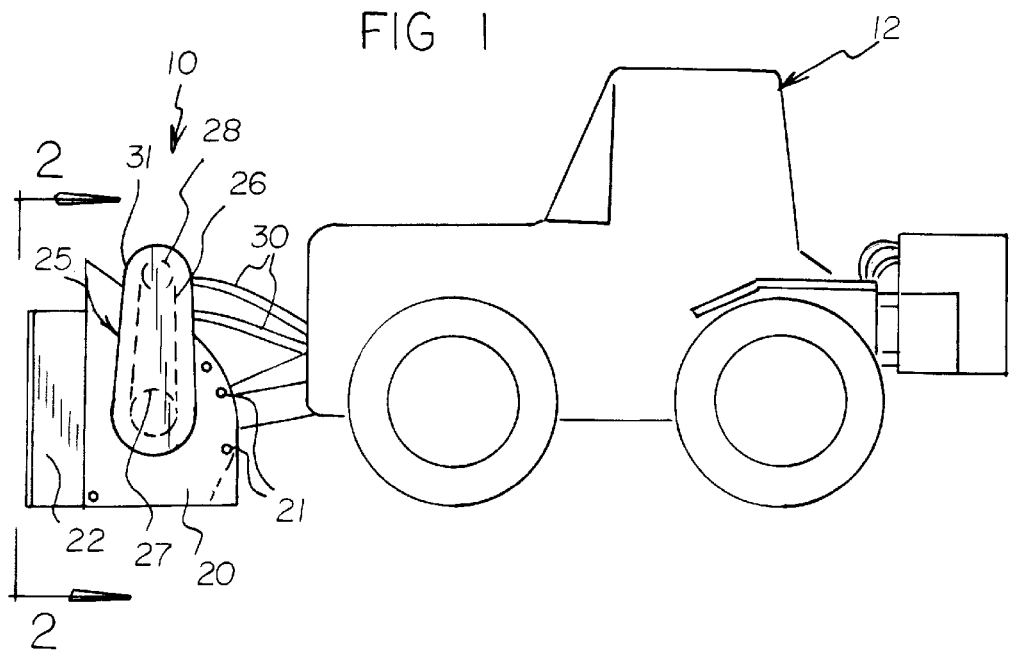
FIG. 1 is a side view of a new windrow auger composter according to the present invention mounted on the blade of a tractor.
Figure 2:
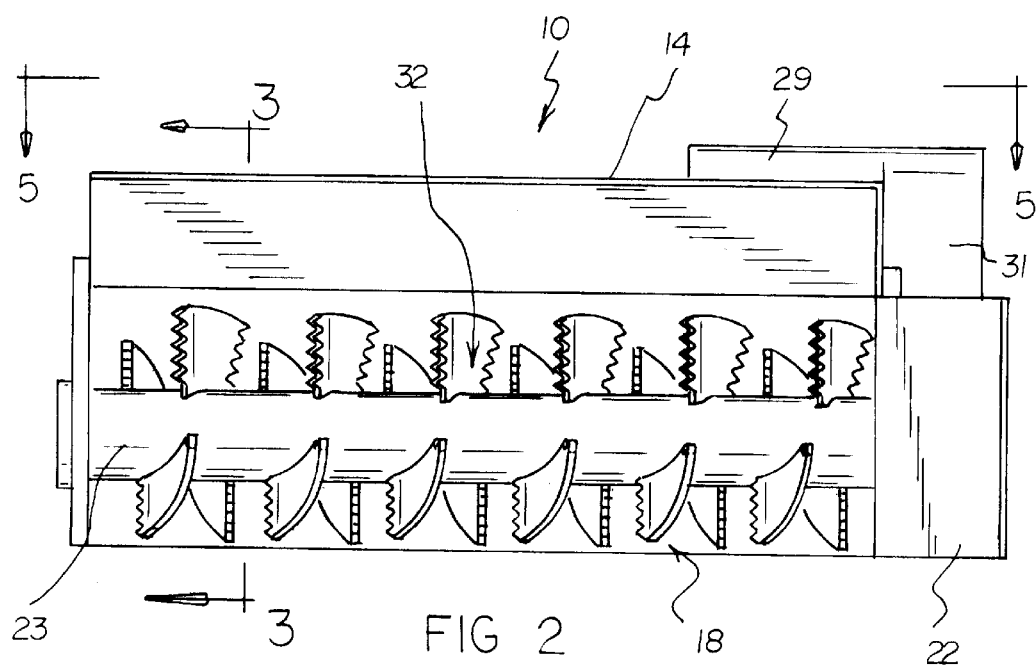
FIG. 2 is a front view of the present invention, looking in the direction of line 2—2 of FIG. 1.

With reference now to the drawings, and in particular to FIGS. 1 through 6 thereof, a new windrow auger composter embodying the principles and concepts of the present invention and generally designated by the reference numeral 10 will be described.

As best illustrated in FIGS. 1 through 6, the windrow auger composter 10 is adapted for use with a 4×4 tractor 12 having a blade 13 mounted on a front end of the tractor in a conventional manner. The composter could also be used with other types of vehicles having blades attached thereto, such as a bulldozer.

Figure 3:
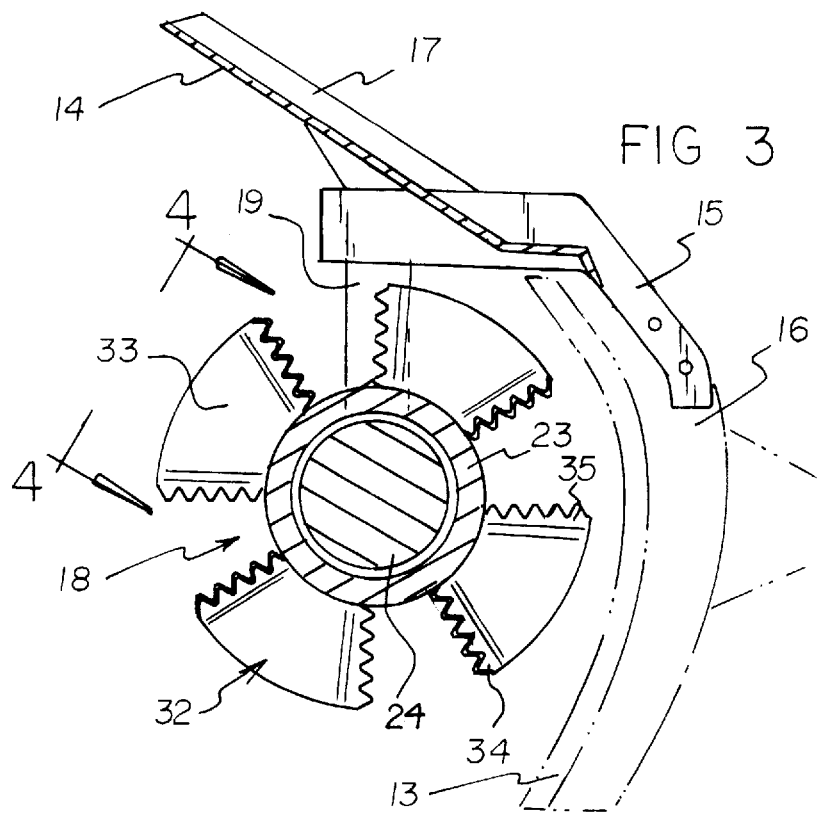
FIG. 3 is a cross sectional view taken along line 3—3 of FIG. 2.
Figure 4:
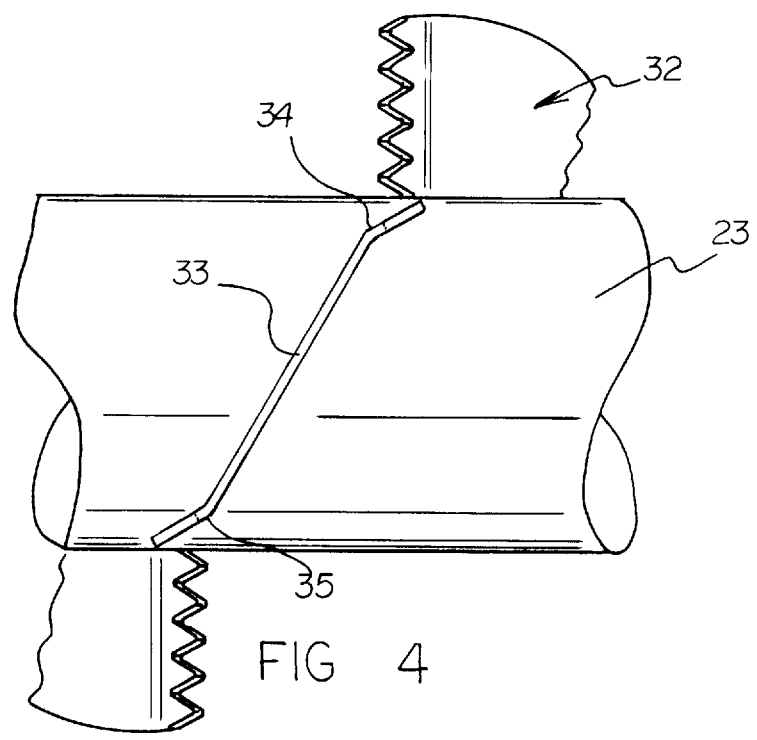
FIG. 4 is a view looking in the direction of line 4—4 of FIG. 3.

The composter 10 includes a metal housing 14 which is sized such that it extends along the entire length of the blade 13. A plurality of attachment flanges 15 are connected to the housing 14 for engagement with a corresponding plurality of flanges 16 formed on the backside of the blade 13, with bolts or other suitable fasteners extending through the flanges 15 and 16 so as to attach the housing 14 to the blade. Stiffening ribs 17 are formed on the backside of the housing 14 in order to strengthen the housing 14. Thus, as best seen in FIG. 3, when the housing 14 is attached to the blade 13, the housing 14 extends forwardly at an angle from the top edge of the blade 13 (illustrated in dashed lines), such that the blade and housing form a substantially continuous unit to prevent material from escaping between the top edge of the blade and a bottom edge of the housing.

An auger assembly 18 is supported for rotation by the housing 14, such that the assembly 18 is disposed directly in front of the blade 13 and below the housing 14, when the housing is mounted on the blade. A vertically oriented support arm 19 located at one end of the housing supports one end of the assembly 18, while a vertically disposed end plate 20 connected to the opposite end of the housing supports the opposite end of the auger assembly. The end plate 20, as shown in FIG. 1, is attached to the blade 13 by bolts 21 or the like, extending through the plate into engagement with the blade. Angled guide member 22 is connected to the end plate and extends therefrom in a direction away from the blade so as to direct material into the auger assembly 18.

The auger assembly 18 itself comprises a cylindrical tube 23 which is rotationally supported at each of its ends by the support arm 19 and the end plate 20. The tube 23 is disposed around a stationary, central axle 24 which supports the tube. The tube 23 is rotationally driven by a drive assembly 25 which is mounted on the end plate 20. A driving belt or chain 26 of the assembly 25 engages at a first end thereof with a pulley or sprocket 27 which is attached to the tube 23. A second end of the belt or chain 26 engages with a drive pulley or sprocket 28 which is driven by a motor 29 disposed on top of the housing 14. The motor 29 is preferably a hydraulic motor which is connected with the hydraulic system of the tractor 12 through hydraulic lines 30. However, other types of motors can be used instead of a hydraulic motor, such as an electric motor. The belt/chain 26, pulley/sprocket 27, and drive pulley/sprocket 28 are all enclosed within a housing 31 in order to protect them from the material being windrowed.

A plurality of blade members 32 are attached to the outer surface of the tube 23 for engaging the material and causing movement thereof when the auger assembly is rotated. The blade members are disposed in four rows on the tube with each row having six blade members. As shown, the blade members are angled relative to a longitudinal axis of the tube, such that the blade members move the material toward the right side of the composter, i.e. away from the end plate 20, when the auger assembly is rotated in a clockwise direction when viewing FIG. 3. This clockwise rotation also causes the blade members to throw the material up in the air as it is being moved to the right, in order to increase the oxygen content of the material.

The blade members 32 are generally plate like, having a central planar portion 33 and leading and trailing edges 34,35. The edges 34,35 extend substantially radially from the tube 23, and are serrated for chopping and cutting-up the material which is contacted by the blade members. Additionally, the edges 34,35 are angled relative to the central portion 33 for causing increased movement of the material to the right.

In use, the composter 10 is attached to the blade by securing the attachment flanges 15 to the flanges on the blade and securing the end plate to the blade. The hydraulic lines 30 are then connected to permit operation of the motor 29. Once the composter is properly mounted, the motor is actuated to drive the auger assembly in the direction opposite from the direction of rotation of the wheels of the tractor. Material contacted by the blade members of the auger assembly is thrown into the air and moved to the right of the composter, and deposited into a windrow to the side of the tractor. The serrated edges of the blade members break up large chunks of the material, thus increasing the oxygen content of the material.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A windrow composter for use with a vehicle having a blade mounted on a front end thereof, comprising:
    a housing adapted for attachment to the blade such that the housing extends upwardly from a top edge of the blade when attached thereto;
    an auger assembly supported for rotation by the housing, said auger assembly including a plurality of blade members positioned in spaced relationship with respect to each other along the length of the auger assembly, said blade members being angled relative to a longitudinal axis of the auger assembly such that said plurality of blades are adapted to urge materials contacting said plurality of blades towards one side of said auger when said auger assembly is rotated;
    each said blade further having edges adapted for cutting said material contacting said blades when said auger assembly is rotated; and
    means for rotating said auger assembly.

2. The windrow composter according to claim 1, wherein said auger assembly comprises a cylindrical tube disposed for rotation about a central axle which extends through the tube, said plurality of blade members being connected to an outer surface of the tube.

3. The windrow composter according to claim 2, wherein said plurality of blade members are disposed in rows on said cylindrical tube.

4. The windrow composter according to claim 3, wherein there are four of said rows.

5. The windrow composter according to claim 2, wherein each said blade member comprises a plate and said edges include leading and trailing edges extending substantially radially from the tube.

6. The windrow composter according to claim 5, wherein said leading and trailing edges are serrated.

7. The windrow composter according to claim 5, wherein said leading and trailing edges are angled relative to a central planar portion of the plate.

8. A windrow composter for use with a vehicle having a blade mounted on a front end thereof, comprising:
    a housing adapted for attachment to the blade such that the housing extends upwardly from a top edge of the blade when attached thereto;
    an auger assembly supported for rotation by the housing, said auger assembly including a plurality of blade members spaced along the length thereof, said blade members being angled relative to a longitudinal axis of the auger assembly;
    means for rotating said auger assembly; and
    wherein said housing includes a plurality of attachment flanges spaced along the length thereof, said attachment flanges being disposed adjacent a corresponding plurality of flanges formed on the blade to permit attachment of the housing to the blade.

9. The windrow composter according to claim 8, wherein a vertically oriented end plate is disposed at one end of the housing, said end plate supporting a first end of the auger assembly and being adapted for attachment to an end of the blade.

10. The windrow composter according to claim 9, wherein a support arm is connected to a second end of the housing, said support arm being vertically oriented and supporting a second end of the auger assembly.

11. The windrow composter according to claim 9, further comprising a guide member connected to the end plate and extending therefrom at an angle relative to a vertical plane of the end plate.

12. The windrow composter according to claim 11, wherein said guide member is angled in a direction away from the end of the blade.

13. The windrow composter according to claim 9, wherein said means for rotating comprises a drive assembly mounted on the end plate.

14. The windrow composter according to claim 8, wherein said auger assembly comprises a cylindrical tube disposed for rotation about a central axle which extends through the tube, said plurality of blade members being connected to an outer surface of the tube.

15. The windrow composter according to claim 14, wherein said plurality of blade members are disposed in rows on said cylindrical tube.

16. The windrow composter according to claim 15, wherein there are four of said rows.

17. The windrow composter according to claim 14, wherein each said blade member comprises a plate with leading and trailing edges extending substantially radially from the tube.

18. The windrow composter according to claim 17, wherein said leading and trailing edges are serrated.

19. The windrow composter according to claim 17, wherein said leading and trailing edges are angled relative to a central planar portion of the plate.

20. A windrow composter for use with a vehicle having a blade mounted on a front end thereof, comprising:

a housing adapted for attachment to the blade such that the housing extends upwardly from a top edge of the blade when attached thereto;

an auger assembly supported for rotation by the housing, said auger assembly including a plurality of blade members spaced along the length thereof, said blade members being angled relative to a longitudinal axis of the auger assembly;

means for rotating said auger assembly;

wherein said housing includes a plurality of attachment flanges spaced along the length thereof, said attachment flanges being disposed adjacent a corresponding plurality of flanges formed on the blade to permit attachment of the housing to the blade;

wherein a vertically oriented end plate is disposed at one end of the housing, said end plate supporting a first end of the auger assembly and being adapted for attachment to an end of the blade;

wherein a support arm is connected to a second end of the housing, said support arm being vertically oriented and supporting a second end of the auger assembly;

a guide member connected to the end plate and extending therefrom at an angle relative to a vertical plane of the end plate;

wherein said guide member is angled in a direction away from the end of the blade;

wherein said auger assembly comprises a cylindrical tube disposed for rotation about a central axle which extends through the tube, said plurality of blade members being connected to an outer surface of the tube;

wherein said plurality of blade members are disposed in rows on said cylindrical tube;

wherein there are four of said rows;

wherein each said blade member comprises a plate with leading and trailing edges extending substantially radially from the tube;

wherein said leading and trailing edges are serrated;

wherein said leading and trailing edges are angled relative to a central planar portion of the plate; and wherein said means for rotating comprises a drive assembly mounted on the end plate.

* * * * *